US011959816B2

(12) United States Patent
Kirch

(10) Patent No.: US 11,959,816 B2
(45) Date of Patent: Apr. 16, 2024

(54) MULTI-BANDWIDTH COMMUNICATION FOR FLUID DISTRIBUTION NETWORK

(71) Applicant: DropWater Solutions, Gainesville, TX (US)

(72) Inventor: Paul Kirch, Gainesville, TX (US)

(73) Assignee: DROPWATER SOLUTIONS, Gainesville, TX (US)

( * ) Notice: Subject to any disclaimer, the term of this patent is extended or adjusted under 35 U.S.C. 154(b) by 417 days.

(21) Appl. No.: 17/155,898

(22) Filed: Jan. 22, 2021

(65) Prior Publication Data

US 2021/0223128 A1 Jul. 22, 2021

Related U.S. Application Data

(60) Provisional application No. 62/964,220, filed on Jan. 22, 2020.

(51) Int. Cl.
*G01L 19/08* (2006.01)
*F04D 15/00* (2006.01)
*H04W 4/38* (2018.01)
*H04W 52/02* (2009.01)

(52) U.S. Cl.
CPC ........ *G01L 19/086* (2013.01); *F04D 15/0088* (2013.01); *G01L 19/083* (2013.01); *H04W 4/38* (2018.02); *H04W 52/0261* (2013.01)

(58) Field of Classification Search
CPC ...... G01L 19/086; G01L 19/083; H04W 4/38; H04W 52/0261; F04D 15/0088
USPC .......................................................... 73/700
See application file for complete search history.

(56) References Cited

U.S. PATENT DOCUMENTS

| 7,031,778 | B2 | 4/2006 | Hsiung et al. |
| 7,083,202 | B2 | 8/2006 | Eberle et al. |
| 7,249,628 | B2 | 7/2007 | Pillion et al. |
| 8,082,217 | B2 | 12/2011 | Crossley et al. |
| 8,567,177 | B1 * | 10/2013 | Drori ............... F01D 25/32 |
| | | | 60/39.55 |

(Continued)

FOREIGN PATENT DOCUMENTS

WO WO-2007107815 A1 * 9/2007 ......... E21B 47/0007

OTHER PUBLICATIONS

Notice of Allowance as issued in U.S. Appl. No. 17/155,920, dated Feb. 14, 2022.

(Continued)

*Primary Examiner* — Nathaniel T Woodward
(74) *Attorney, Agent, or Firm* — Pillsbury Winthrop Shaw Pittman LLP

(57) ABSTRACT

A method includes obtaining a set of pressure measurements at an electronic pump and storing the set of pressure measurements in a memory storage, where each measurement time of the set of pressure measurements is within a measurement duration. The method includes determining and sending a measure of central tendency to a second computing device via a first wireless signal. The method also includes determining a subset of pressure measurements based on the set of pressure measurements. The method includes transferring the first subset of pressure measurements to a data collection device via a second wireless signal, wherein an operating frequency of the second wireless signal is greater than one gigahertz and deleting the first subset of measurements from the memory storage.

20 Claims, 5 Drawing Sheets

(56) References Cited

U.S. PATENT DOCUMENTS

| | | |
|---|---|---|
| 8,616,274 B2 | 12/2013 | Belcher et al. |
| 8,776,617 B2 | 7/2014 | Durham et al. |
| 9,297,374 B2 | 3/2016 | Braggin et al. |
| 9,309,872 B2 | 4/2016 | Gonnella et al. |
| 9,719,504 B2 | 8/2017 | Vines et al. |
| 9,963,961 B2 | 5/2018 | Hardin et al. |
| 10,000,704 B2 | 6/2018 | Young et al. |
| 10,067,507 B2 | 9/2018 | Davoodi et al. |
| 10,151,171 B2 | 12/2018 | Noske et al. |
| 10,260,327 B2 | 4/2019 | Kajaria et al. |
| 10,480,547 B2 | 11/2019 | Starkey et al. |
| 2008/0097913 A1* | 4/2008 | Dicks .................. G16H 40/67 705/50 |
| 2013/0240044 A1 | 9/2013 | Shreve et al. |
| 2015/0142319 A1 | 5/2015 | McCoy |
| 2015/0308919 A1 | 10/2015 | Zhang et al. |
| 2017/0089328 A1 | 3/2017 | Sato et al. |
| 2018/0013293 A1 | 1/2018 | Block et al. |
| 2018/0284752 A1* | 10/2018 | Cella .................. H04L 67/12 |
| 2019/0187679 A1 | 6/2019 | Strudwicke et al. |
| 2019/0356537 A1 | 11/2019 | Grindeland |
| 2020/0064797 A1 | 2/2020 | Hannon et al. |
| 2021/0216860 A1 | 7/2021 | Poghosyan et al. |

OTHER PUBLICATIONS

Non-Final Office Action as issued in U.S. Appl. No. 17/155,869, dated Oct. 12, 2022.
Notice of Allowance as issued in U.S. Appl. No. 17/155,869, dated Jun. 14, 2023.

\* cited by examiner

MULTI-BANDWIDTH COMMUNICATION FOR FLUID DISTRIBUTION NETWORK

CROSS-REFERENCE TO RELATED APPLICATIONS

This patent claims the benefit of the following U.S. Provisional Patent Applications: U.S. 62/964,216, titled SMART PUMP CONTROLLER, filed 22 Jan. 2020; U.S. 62/964,213, titled WIRELESS MESH FOR FLUID DISTRIBUTION NETWORK, filed 22 Jan. 2020; U.S. 62/964,220, titled MULTI-BANDWIDTH COMMUNICATION FOR FLUID DISTRIBUTION NETWORK, filed 22 Jan. 2020. The entire content of each aforementioned patent filing is hereby incorporated by reference.

BACKGROUND

1. Field

This disclosure relates generally to electronic pumps and, more particularly, to networks of electronic pumps.

2. Background

Fluid distribution networks are useful for providing fluids throughout large geographic regions that can span tens, hundreds or even thousands of kilometers. A fluid distribution network may be used to transport water, gas, and other fluids from a fluid source to one or more fluid destinations. A fluid distribution network may include various electronic components such as electronic pumps, sensors, and or other monitoring devices. These electronic components may provide various types of data and may have sampling rates between once per month to once per millisecond.

SUMMARY

The following is a non-exhaustive listing of some aspects of the present techniques. These and other aspects are described in the following disclosure.

Some aspects include a process that includes obtaining a first set of measurements at a first computing device of a first electronic pump, where a wireless device is in wired communication with the first computing device, and where each measurement time of the first set of measurements is within a measurement duration. The process also includes determining a first set of values based on the first set of measurements, where the first set of values has a fewer number of values than the first set of measurements, and where determining the first set of values includes determining a sum of the first set of measurements. The process also includes storing the first set of measurements in a memory of the first computing device and sending the first set of values to a second computing device via a first wireless signal transmitted by the wireless device, where an operating frequency of the first wireless signal is within a first frequency range, and where the first frequency range is inclusively between zero hertz and one gigahertz. The process also includes determining a first subset of measurements based on the first set of measurements, where the first subset of measurements includes a first measurement and a second measurement, and where the first measurement was measured in an earliest quartile of the measurement duration and the second measurement was measured in a latest quartile of the measurement duration. The process also includes transmitting the first subset of measurements to a third computing device via a second wireless signal, where an operating frequency of the second wireless signal is within a second frequency range that is greater than one gigahertz. The process also includes associating the first subset of measurements with a second indicator to indicate that the first set of measurements have been transferred.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
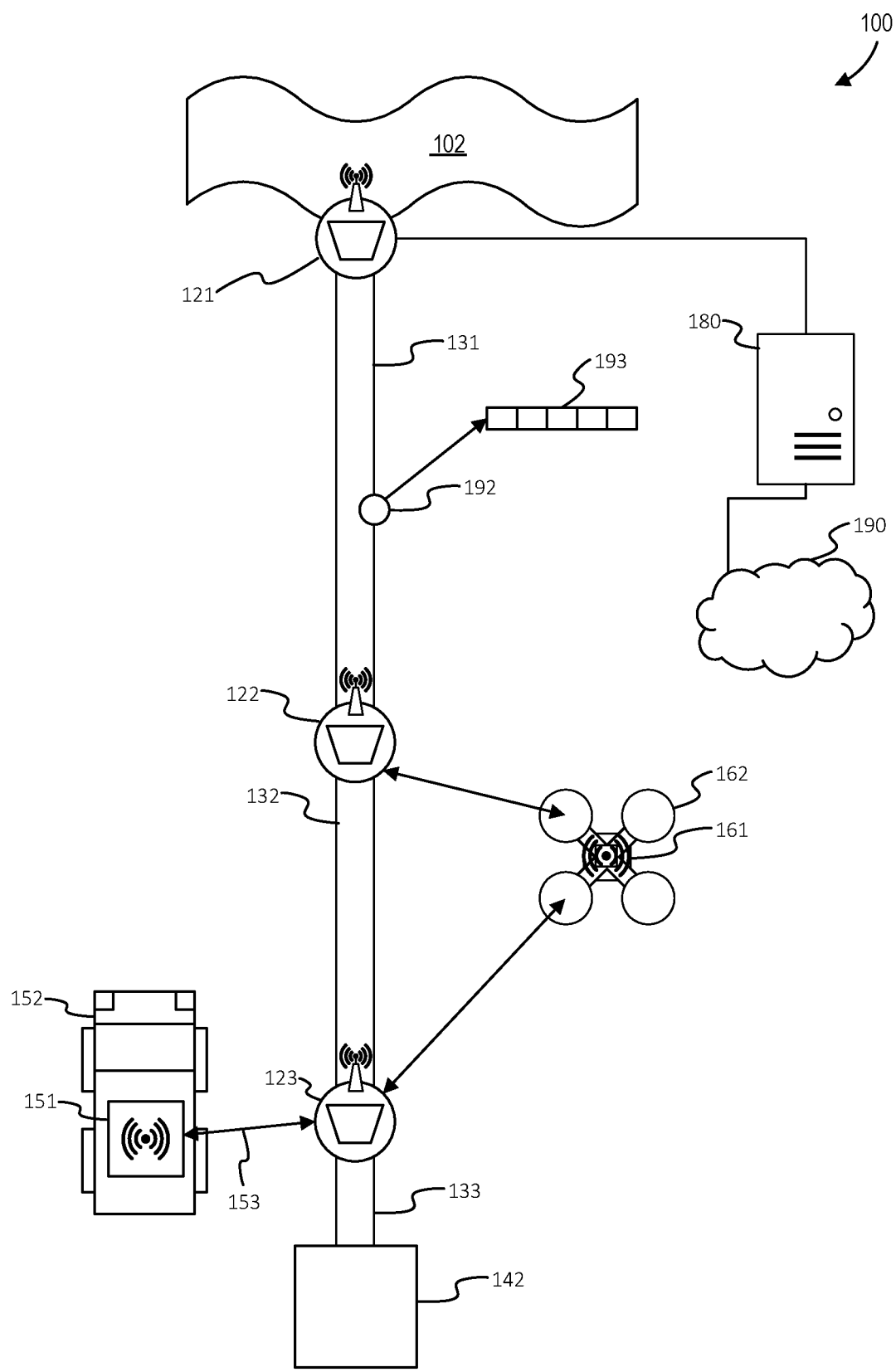
FIG. 1 is a diagram of a fluid distribution network using the present techniques, in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of fluid distribution networks. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments include the use of electronic pumps or other devices as nodes of a wireless mesh network. A node (e.g., an electronic pump or another electronic device) may include or be otherwise in high-bandwidth communication with one or more sensors (e.g., greater than or equal to 0.01 megabytes per second download or upload speed). In some embodiments, the one or more sensors may be capable of producing large amounts of data over time, such as more than 100 megabytes (MB) per day, more than 1 gigabyte (GB) of data per day, more than 10 GB per day, or the like. In some embodiments, one or more long-range wireless connections of the wireless mesh network may be bandwidth-limited and unable to transmit a target amount of data through the wireless mesh network. In some embodiments, measurements not transmitted over a long-range wireless signal may be stored in a local memory storage of a node and transferred to a mobile data collection device when the mobile data collection device is within range of the node.

Some embodiments may include operations to transmit additional data over short-range wireless signals. Short-range wireless signals may be transmitted with higher operating frequencies and higher bandwidths. Some embodiments may also account for the intermittent nature of high-bandwidth data transfer in remote locations by including operations to transfer the measurements to the data collection device in time-distributed subsets of measurements. A time-distributed subset of measurements may include at least one measurement that was measured in a first time interval and a second measurement that was measured in a second time interval, where the first time interval and second time interval are non-overlapping intervals of a measurement duration. As further described below, the time intervals may be of approximately equal duration with respect to each other (e.g., within 10%, within 20%, within 30%, or the like). For example, the first time interval may be a first third or quartile of a measurement duration, and the second time interval may be a last third or quartile of the measurement duration.

By transmitting different types of data using a multi-bandwidth approach, some embodiments may be able to provide sufficient data to increase day-to-day operational efficiency while reducing bandwidth consumption. In addition, some embodiments may provide high-volume data that may be used to increase long-term system efficiency. The high-volume data may be used to determine equipment degradation issues and detect long-term operational trends. In addition, the high-volume data may be used to provide increased predictive capabilities when planning for any future deployment of equipment to install a fluid distribution network.

FIG. 1 is a diagram of a fluid distribution network using the present techniques, in accordance with some embodiments. The fluid distribution system 100 includes electronic pumps 121-123, pipes 131-133, and a server 180 in connection with a cloud system 190. One or more of the electronic pumps 121-123 may include a computing device to perform one or more of the operations described below. For example, the electronic pumps 121-123 may include electronic pumps or perform operations disclosed in the U.S. patent application 62/964,216, titled SMART PUMP CONTROLLER, filed on 22 Jan. 2020, which incorporated herein by reference.

In some embodiments, one or more of the electronic pumps 121-123 may include communication equipment with mesh capabilities, including long-range radio mesh communication, wireless signal transmitters, wireless signal receivers, satellite communication systems, Bluetooth, near-field communication ("NFC") communication systems, or the like. The communication equipment may be used to allow communication between each of the electronic pumps 121-123 with at least one of the other of the electronic pumps 121-123. In some embodiments, the electronic pumps may form a wireless mesh network, such as a Long Range ("LORA") network or another low-power wide area network ("LPWAN"). In some embodiments, the operating frequencies of long-range wireless signals transmitted and received by a long-range wireless mesh network may be within a sub-gigahertz range (i.e., the operating frequency is inclusively between zero hertz and one gigahertz). Use of a sub-gigahertz frequency network, such as a LORA network, allows for large distances to be covered by the wireless mesh network, where large distances may include ranges such as 200 meters or greater, 1 kilometer (km) or greater, 10 km or greater, or the like. In addition, use of a LORA or other LPWAN system may allow a computing device to determine the position of one or more electronic pumps or other electronic devices in the network. Some embodiments may use the mesh network to wirelessly send messages, provide sensor outputs, and respond to sensor measurements using one or more operations described in U.S. patent application 62/964,213, titled WIRELESS MESH FOR FLUID DISTRIBUTION NETWORK, filed 22 Jan. 2020, which is incorporated herein by reference.

During an operation of the fluid distribution system 100, one or more of the electronic pumps 121-123 may be used to extract a fluid from the fluid source 102 and transport the fluid through the pipes 131-133 to the fluid destination 142. The fluid source 102 or the fluid destination 142 may include a lake, a river, a well, or the like. The fluid distribution system 100 may include a wireless-enabled sensor 192 to monitor fluids flowing through the pipe 131 and send measurements 193 via wireless signals. In some embodiments, operational parameters of one or more of the electronic pumps 121-123 may be modified to change a flow rate or other property of the fluid flow through the fluid distribution system 100.

In some embodiments, an electronic pump of the fluid distribution system 100 may communicate with one or more electronic devices such as digital sensors using various I/O equipment, such as a ModBus RS-485 serial bus or RS-132 bus, either of which may be configured to support the ModBus RTU 1 protocol. In some embodiments, one or more of the computing devices of the set of electronic pumps 121-123 may operate a web server for hosting intranet sites. For example, some embodiments may use a computing device of the first electronic pump 121 to collect data from each set of sensors of each of the electronic pumps 121-123. Furthermore, in some embodiments, various sensors may be attached to I/O equipment. For example, a pressure transducer may be placed into the fluid source 102 to take a pressure measurement at one or more depths of the fluid source 102. Data from the pressure transducer may be obtained at a computing device of the first electronic pump 121, transmitted via a long-range wireless signal to the electronic pump 122, or transferred via a short-range wireless signal to a data collection device such as the data collection device 151 or the data collection device 161.

In some embodiments, a data collection device 151 may be transported by a wheeled vehicle 152. In some embodiments, the wheeled vehicle 152 may be an autonomous vehicle. Alternatively, or in addition, the wheeled vehicle may be driven by a user or directly controlled by a vehicle driver. The data collection device 151 may be part of an onboard computing device or otherwise attached to the wheeled vehicle 152. Alternatively, the data collection device 151 may be separate from the wheeled vehicle 152 and may be a mobile computing device (e.g., as a cellular phone, tablet, laptop, or other mobile computing device).

The arrow 153 indicates a wireless connection between the data collection device 151 and the electronic pump 123. As further described below, one or more wireless signals may be transferred between the data collection device 151 and the electronic pump 123 to transmit data that may otherwise be infeasible to send over long-range radio signals in their entirety. In some embodiments, GPS coordinates for each of the electronic pumps 121-123 may be sent to the wheeled vehicle 152 via the data collection device 151 or another communication device. In some embodiments, the wheeled vehicle 152 may be autonomously controlled and may drive across a dynamically-planned route to arrive within a communication range of the electronic pump 123 based on the GPS coordinates. As further described below, once the data collection device is in range of a short-range wireless device of the electronic pump 123, the electronic pump 123 may transmit a set of measurements or other values to the data collection device 151 that were not transmitted over a LPWAN network.

In some embodiments, a wireless signal may include a single electromagnetic wave. Alternatively, or in addition, the wireless signal may include multiple electromagnetic waves to be transmitted across a plurality of frequencies or frequency channels. Furthermore, a wireless signal may include electromagnetic waves transmitted at different times. For example, a wireless signal may be transmitted as a first set of radio waves and a second set of radio waves, where the first set of radio waves are transmitted 5 milliseconds before the second set of radio waves. Similarly, a set of sensor measurements may be transmitted in a wireless signal by transmitting a first subset of the sensor measurements in a first set of radio waves and then transmitting a second subset of the sensor measurements in a second set of radio waves, where the second set of radio waves are sent 50 milliseconds after the first set of radio waves are sent. In addition, the wireless signal may include one or more set of geospatial coordinates indicating a geospatial position of a sensor or other component of a fluid distribution network.

In some embodiments, a data collection device 161 may be transported by an aerial vehicle 162. In some embodiments, the aerial vehicle 162 may be an unmanned aerial vehicle (UAV) that is autonomous or remotely controlled by a user. For example, the aerial vehicle 162 may be an autonomous UAV that may receive geospatial coordinates and autonomously fly to the geospatial coordinates. Alternatively, or in addition, the aerial vehicle 162 may be flown directly by a pilot. The data collection device 161 may be part of an onboard computing device or otherwise attached to the aerial vehicle 162. Alternatively, the data collection device 161 may be separate from the aerial vehicle 162 (e.g., as a cellular phone, tablet, laptop, or another mobile computing device).

In some embodiments, an electronic pump or another component of a fluid distribution network may include a wireless charging device. The wireless charging device may be activated after receiving a signal from a data collection device and be used to provide power to the data collection device when the data collection device is within range of the wireless charging device. Example wireless charging devices may include using radio charging devices, inductive charging devices, or resonance charging devices. In some embodiments, the aerial vehicle 162 may land on or in the proximity of an inductive charging device of the electronic pump 122. The inductive charging device of the electronic pump 122 may be activated after determining that the aerial vehicle 162 is within range and begin charging the aerial vehicle 162. In some embodiments, the wireless charging device may be powered by a solar power system, as further described below.

In some embodiments, the set of electronic pumps 121-123 may include a solar power system. The solar power system may include a solar cell or other photoelectric material. In some embodiments, the solar power system may include a battery in electrical contact with the solar power system. In some embodiments, the set of electronic pumps 121-123 may include a second battery charged by the first solar cell. For example, a solar power system of the first electronic pump 121 may include a current-limited battery charger with an AC-DC converter or a DC-DC converter to charge one or more other electronic components of the first electronic pump 121. For example, after a set of automation batteries of the first electronic pump 121 reaches a threshold charge capacity, excess energy in the set of automation batteries may be used to charge a pump engine battery. In some embodiments, the batteries may be used to provide energy to other equipment such as lighting equipment and may include an alternator to further provide electrical energy to one or more types of lighting equipment.

Figure 2:
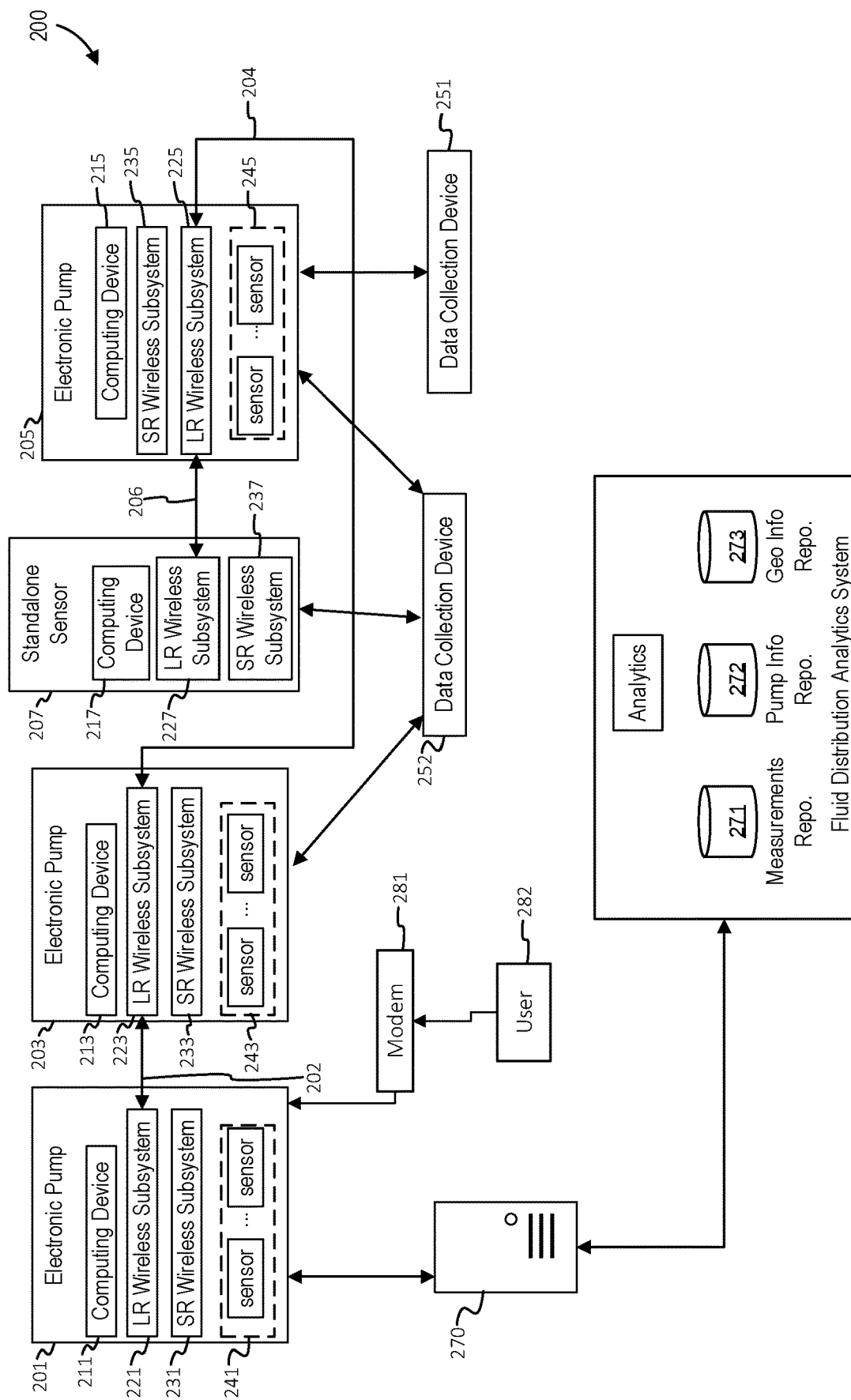
FIG. 2 is a logical-and-physical-architecture block diagram illustrating a computing environment and data transfer system in a mesh network that may be implemented with the present techniques, in accordance with some embodiments.

FIG. 2 is a logical-and-physical-architecture block diagram illustrating a computing environment and data transfer system in a mesh network that may be implemented with the present techniques, in accordance with some embodiments. In some cases, some or all of the above-describe techniques may be implemented in the mesh network 200. Electronic devices such as electronic pumps 201, 203, or 205, or a standalone sensor 207 may include one of the computing devices 211, 213, 215, or 217. While the standalone sensor 207 is shown as having the computing device 217, some sensors may be capable of providing measurements without including computing devices.

The electronic pumps 201, 203, or 205 or the standalone sensor 207 may each include one of a set of long-range wireless subsystems 221, 223, 225, or 227. The arrow 202 may represent a long-range wireless communication between the long-range wireless subsystems 221 and 223, enabling data to be transferred between the electronic pumps 201 and 203. Similarly, the arrow 204 may represent a long-range wireless communication between the long-range wireless subsystems 223 and 225, enabling data to be transferred between the electronic pumps 203 and 205. Similarly, the arrow 206 may represent a long-range wireless communication between the long-range wireless subsystems 225 and 227, enabling data to be transferred between the electronic pump 205 and the standalone sensor 207. Each of the long-range wireless subsystems 221, 223, 225, or 227 may include components for a mesh network (e.g., a LPWAN network such as a LORA network), such as transmitters or receivers. A LPWAN system may include transmitters and receivers to transmit and receive wireless signals having operating frequencies within a sub-gigahertz frequency range. Wireless signals operating within the sub-gigahertz frequency range may have a greater effective physical range than wireless signals of short-range wireless technologies such as WiFi or Bluetooth.

The standalone sensor 207 may include a multi-measurement standalone sensor. For example, the standalone sensor 207 may provide a pressure measurement, a temperature measurement, or a humidity measurement. The standalone sensor may use the long-range wireless subsystem 227 to provide pressure, temperature, or humidity measurements to nodes of a mesh network via one or more long-range wireless signals. For example, the standalone sensor may transmit a mean average pressure every minute, where the pressure measurement may be a mean average of other pressure measurements taken every second.

In some embodiments, one or more of the electronic pumps 201, 203, or 205 may include or be otherwise connected to sets of sensors 241, 243, or 245, respectively. For example, the electronic pump 201 may include and receive data from the set of sensors 241, where the set of sensors 241 may include one or more types of sensors positioned at one or more locations of the electronic pump. The set of sensors 241 may include an inlet pressure sensor, a discharge pressure sensor, an inlet temperature sensor, a discharge temperature sensor, a flowmeter, a valve position sensor, or the like. In some embodiments, a sensor reading may correspond with an operational parameter. For example, a sensor measurement may include a pump rotor speed and may correspond with an operational parameter such as a target pump rotor speed. Furthermore, while some embodiments may include components of a LORA network, other embodiments are possible. For example, some electronic pumps, sensors, or other components of a fluid distribution network may include or otherwise use devices of sub-gigahertz communication networks such as a long-term evolutionary machine type communication ("LTE-M") network, a network based on binary phase-shift keying (e.g., a SigFox network), narrowband internet of things network ("NB-IoT"), or the like.

The electronic pumps 201, 203, or 205, or the standalone sensor 207 may each include one of a set of short-range wireless subsystems 231, 233, 235, or 237 to communicate with data collection devices. One or more of the short-range wireless subsystems 231, 233, 235, or 237 may include various components such as a WiFi system (e.g., "WiFi-802.11a/b/g/n" system), a Bluetooth system, NFC system, or the like). Some embodiments may include a data collection device 251 that may be within a communication range of the short-range wireless subsystem 235 and be able to transmit and receive data from the electronic pump 205. Similarly, the mesh network 200 may include a data collection device 252 that may be within a communication range of the short-range wireless subsystem 233, 235, or 237 and be able to transmit and receive data from the electronic pumps 203 or 205 or the standalone sensor 207 via the short-range wireless devices 235-237. As shown in FIG. 2, the data collection devices 251-252 may include processors, memory, network interfaces, an operating system, and various sensors like an inertial measurement unit sensor or a geolocation sensor. In some embodiments, the analytical operations described below may use the data provided by one or more data collection devices as additional inputs.

Data collected by the sets of sensors 241, 243, or 245, the standalone sensor 207, data collection devices 251-252, or other devices can be processed by one of the computing devices 211, 213, 215, or 217 and transmitted to a computing device 270. In some embodiments, a portion of the collected data may be transmitted via a LPWAN network via sub-gigahertz wireless signals. Alternatively, or in addition, a portion of the collected data may be transmitted first to a data collection device such as the data collection device 251 or data collection device 252 and then transmitted to the computing device 270 via short-range wireless signals or wired signals. The computing device 270 of a fluid distribution network may then be used to process the collected data further, generate analytical or predictive results, generate any applicable alerts, or send instructions to components of the fluid distribution network.

In some embodiments, the mesh network 200 includes the computing device 270, which may be configured to receive data from any of the above-described components. Various operations described in this disclosure may be executed on a single server of a local computing layer, a distributed computing network operating as part of a top-view computing layer, a cloud-based application on the top-view computing layer, some combination thereof. As shown in FIG. 2, the computing device 270 may include a measurement repository 271, an equipment profile repository 272, and a geographic information system (GIS) repository 273. The measurement repository 271 may store measurements from sensors and results computed from the measurements. For example, the measurement repository 271 may store one or more measurements that include one or more average discharge pressures. The equipment profile repository 272 may store operational parameters or other values corresponding to pumps or other equipment in a fluid distribution network. For example, the equipment profile repository 272 may store one or more equipment profile values comprising an array of operational parameters of one or more pumps of the electronic pumps 201, 203, or 205. The GIS repository 273 may store one or more geospatial coordinates of equipment, data collection devices, geographical features (e.g., elevation, a topological map), a subsurface map (e.g., a three-dimensional map of a subterranean fluid system), or the like. For example, the GIS repository 273 may store a graph and associated geospatial coordinates representing the position of electronic pumps and the pipes connecting the electronic pumps.

In some embodiments, one of the computing devices 211, 213, 215, or 217 of the electronic pumps may perform one or more of the operations described in this disclosure. For example, the computing device 211 may receive messages from the electronic pumps 201, 203, 205 or the standalone sensor 207, perform analytical operations, and transmit instructions to the other electronic pumps 203 or 205 by broadcasting instructions over a mesh network. In addition, one or more of the computing devices of the electronic pumps may be used to host a local web page or web site that includes user interface elements (e.g., buttons, text entry bars, dials, or the like) to modify one or more operational parameters.

Each of the computing devices 211, 213, 215, or 217 may include one or more controllers, serial communication protocol devices (e.g., Modbus devices), or various other electronic components. For example, the computing device 211 may include a programmable logic controller (PLC). Each of the computing devices 211, 213, 215, or 217 may be in communication with one of the short-range wireless subsystems 231, 233, 235, or 237, respectively. For example, the PLC of the computing device 211 may be in communication with the short-range wireless subsystem 231 using a Modbus protocol via a RS-485 serial bus and bridge. Similarly, each of the computing devices 211, 213, 215, or 217 may be in communication with one of the long-range wireless subsystems 221, 223, 225, or 227, respectively, where a long-range wireless subsystem may include a LORA-enabled device such as a LoRaWAN wireless sampling interface that includes a LORA transceiver.

As shown in the mesh network 200, each of the long-range wireless subsystems 221, 223, 225, or 227 may be in communication with each other via a mesh network such as a LORA wireless network. The computing devices 211, 213, 215, or 217 may be described to be in communication with each other via the mesh network via their correspondingly connected wireless subsystems. Similarly, the electronic pumps 201, 203, 205, or standalone sensor 207 may be described to be in communication with each other via the mesh network formed from their corresponding long-range wireless subsystems 221, 223, 225, or 227 or their short-range wireless subsystems 231, 233, 235, or 237.

In some embodiments, the long-range wireless subsystems 221, 223, 225, or 227 may be in communication with one or more users via a modem connected to one or more of the electronic pumps. For example, a user 282 may send a message to the modem 281 via a local WiFi signal, which may then be transmitted to the long-range wireless subsystem 221. The long-range wireless subsystems 221 may then send the message over the LORA network to the long-range wireless subsystems 223 and modify the operation of the electronic pump 203. Furthermore, various other parameters such as library parameters stored in a data library of one or more of the computing devices 211, 213, 215, or 217 to determine values may be transmitted to one or more computing devices using the mesh network 200. For example, library parameters may be transmitted from the modem 281 to the long-range wireless subsystems 221, which may then communicate the library parameters to any computing devices in communication with any of the long-range wireless subsystems 223, 225, or 227 via a wireless signal. The computing devices may then update their respective libraries stored in a local memory storage with the transferred library parameters. In some embodiments, the transferred library parameters may be parameters of a neural network or another learning system. In addition, the long-range wireless subsystems 221, 223, 225, or 227 may be in communication with other devices, such as a geospatial position device, and may transmit one or more geospatial coordinates in a wireless signal.

In some embodiments, the long-range wireless subsystems 221, 223, 225, or 227 may include or otherwise be in direct communication with a computing device that includes a processor and memory, such as one or more of the computing devices 211, 213, 215, or 217. One or more of the computing devices 211, 213, 215, or 217 may then compare measurements from one or more pump sensors, pipe sensors, or other measurement devices to determine the presence of a flow anomaly or other operational anomaly in a fluid distribution network being measured or controlled by the mesh network 200. For example, the computing device 211 of the electronic pump 201 may obtain a first set of pressure measurements communicated from the electronic pump 203 via a wireless signal. The computing device 211 may then use a second set of pressure measurements already stored in the computing device 211 in combination with the first set of pressure measurements and a library of values to determine flow statuses or other data with respect to the operation of a fluid distribution network being monitored by the mesh network 200.

In response to the detection of an anomaly, operations of one or more of the electronic pumps 201, 203, 205, or standalone sensor 207 may be modified. In some embodiments, the detected anomaly may be categorized as a pipe leak or burst. For example, in response to the detection of a pipe leak or burst in the pipe 131 of FIG. 1, a computing device that is part of or otherwise in communication with the mesh network 200 may send instructions to the electronic pump 201 to prevent further flow through the electronic pump 201, which may be controlled by the computing device 211, and where the electronic pump 201 is the first electronic pump 121. In addition, or alternatively, the computing device may send instructions to the computing device 212 to increase a flow rate of the electronic pump 122, which may be controlled by the computing device 212. In some embodiments, the electronic pump 201 may be directly connected to the electronic pump 203 via a pipe, and an instruction to increase flow through the second pump while stopping flow through the first pump may result in the evacuation of fluid in the pipe between the first pump and the second pump. Such evacuation operations for a pipe may be especially useful in response to the detection of a leak or burst in the pipe, which may decrease losses, damage, or contamination caused by the pipe leak or burst.

Figure 3:
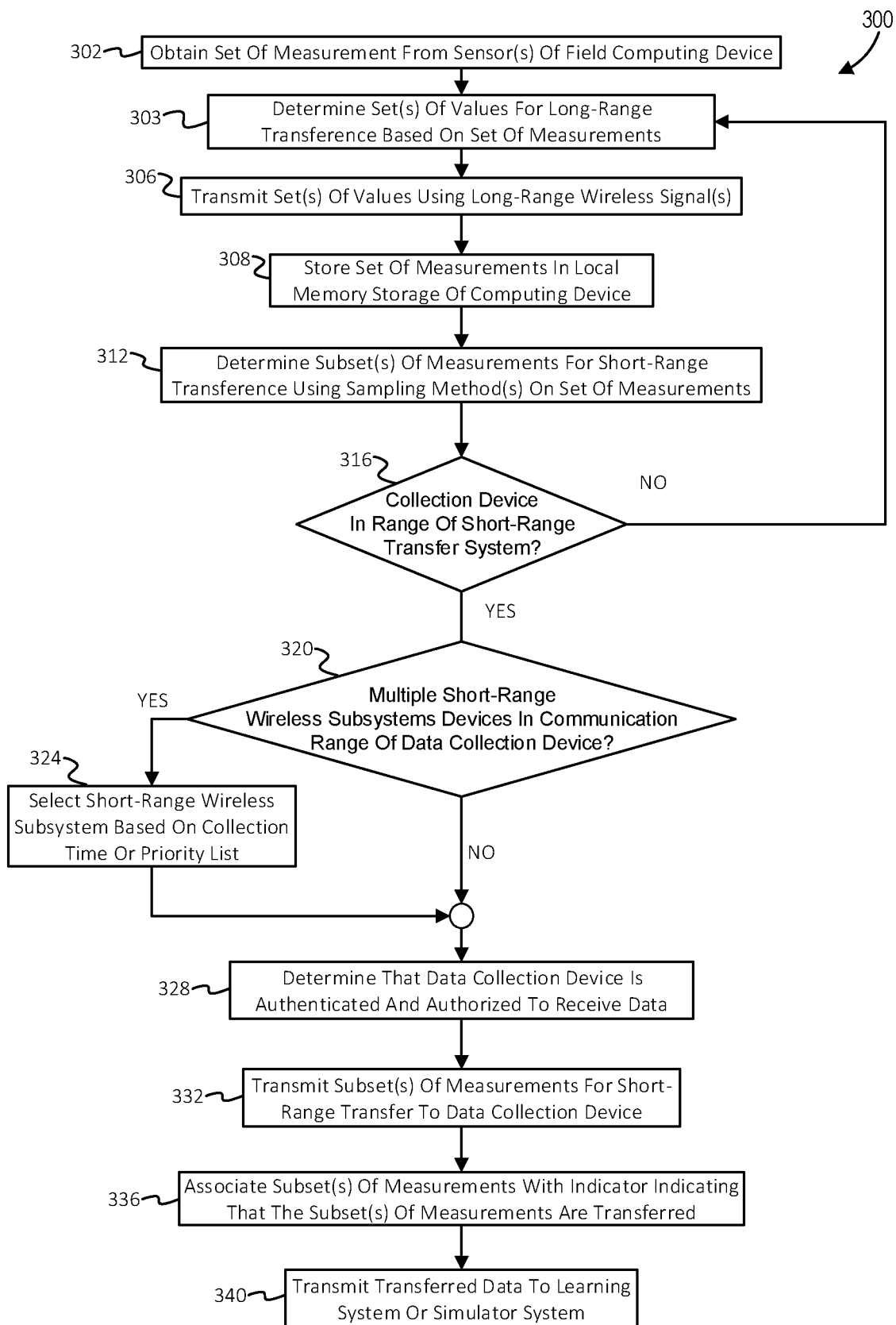
FIG. 3 is a flowchart of operations to control communication between a device in a fluid distribution network and a data collection device, in accordance with some embodiments.

FIG. 3 is a flowchart of operations to control communication between a device in a fluid distribution network and a data collection device, in accordance with some embodiments. In some embodiments, the process 300, like the other processes and functionality described herein, may be implemented by an entity-tracking system that includes computer code stored on a tangible, non-transitory, machine-readable medium, such that when instructions of the code are executed by one or more processors, the described functionality may be effectuated. Instructions may be distributed on multiple physical instances of memory, e.g., in different computing devices, or in a single device or a single physical instance of memory, all consistent with use of the singular term "medium."

In some embodiments, the system may include a computing device of an electronic pump that stores or executes some or all of the computer code to perform one or more operations described below. For example, a computing device of the first electronic pump 121 may execute some or all of the computer code. Alternatively, or in addition, the system may include a computing device of an on-premise server or a cloud system that stores or executes some or all of the computer code to perform one or more operations described below. For example, the system may include the server 180 or an application executing on a provisioned server of the cloud system 190 described above to execute some or all of the computer code to perform one or more operations described below.

In some embodiments, the operations may be executed in a different order from that described. For example, while the process 300 is shown to determine a subset of the measurements after determining a set of values for transmitting via long-range wireless signals, some embodiments may determine a subset of the measurements before determining the set of values for transmitting via long-range wireless signals. In some operations may be executed multiple times per instance of the process's execution, some operations may be omitted, additional operations may be added, some operations may be executed concurrently and other operations may be executed serially, none of which is to suggest that any other feature described herein is not also amenable to variation.

In some embodiments, the process 300 may include obtaining a set of measurements from one or more sensors of a field computing device, as indicated in block 302. The first set of measurements may include various measurements, such as a flow rate, a fluid temperature, a fluid pressure, a fluid resistivity measurement, or the like. Measurements may also include equipment measurements such as a valve position, pump rotations per minute, pump running temperature, pump fuel consumption rate, or the like. The field computing device may be an electronic pump or part of the electronic pump, a standalone sensor, or other computing device in direct communication with a component of a fluid distribution network.

In some embodiments, a plurality of flow measurement types may be measured concurrently. In some embodiments, a measurement rate may be greater than one measurement per hour, greater than one measurement per minute, greater than one measurement per second, or the like. For example, a system may obtain one inlet pressure measurement and one discharge pressure measurement per second. In some embodiments, multiple measurements over a measurement duration may be processed to reduce noise or possible error before further use of the measurements. For example, a measured flow rate over a 30-seconds period may be averaged to determine a single flow rate for the 30-seconds duration. In some embodiments, the set of measurements may include measurements correlated with operational parameters, fluid property measurements, system statuses, or the like. For example, some embodiments may include obtaining measurements such as a discharge pressure or a pump rotation speed.

In some embodiments, the measurements may be pre-processed. Pre-processing measurements may include determining and discarding outliers, reducing sensor noise, normalizing or otherwise re-scaling measurements, performing unit conversions, or the like. For example, a sensor may provide temperature measurements in units of Celsius, and some embodiments may convert the temperatures to Kelvin before further processing. In addition, erroneous measurements caused by a sensor failure, connection errors, or the like may be detected and discarded based on a threshold. For example, a pressure sensor may provide a negative pressure measurement such as −99 due to a connection error. In response, some embodiments may discard pressure measurements from that sensor for a duration (e.g., five seconds) after receiving the negative pressure measurement.

In some embodiments, the process 300 may include determining a set of values for long-range data transfer based on the set of measurements, as indicated in block 303. Long-range data transfer may include a transfer of data via one or more long-range wireless signals. The set of values for transfer via one or more long-range wireless signals may be determined based on the set of measurements and may include one or more measurements from the set of measurements themselves. Some embodiments may select measurements for long-range data transfer based on the measurement being a maximum value, median value, or a minimum value of a set of values. For example, some embodiments may select the minimum value(s) of a set of measurements, where one set of measurements include the measurements "30 kilopascals", "50 kilopascals", and "40 kilopascals." After a determination that "30 kilopascals" is the minimum value of the set of measurements, some embodiments may include "30" in the set of values for long-range data transfer to represent "30 kilopascals." Alternatively, some embodiments may perform a sampling operation by selecting every N-th measurement for long-range data transfer, where N is an integer.

In some embodiments, the set of values for long-range data transfer may include results of functions based on the set of measurements, such as a measure of central tendency, a measure of variance, or the like. For example, a processor of an electronic pump may compute a mean average of a set of pressure measurements. In some embodiments, a value determined from the measurements may be sent in a long-range message that also includes a measurement duration, where the measurements used to determine the value may include the measurement duration.

In some embodiments, the process 300 may include transmitting the set of values using one or more long-range wireless signals, as indicated in block 306. In some embodiments, the long-range wireless signals may have operating frequencies less than one gigahertz. For example, the long-range wireless signals may be transmitted over a LORA network having an operating frequency between 885 and 940 megahertz.

In some embodiments, the set of values for long-range data transfer may be transmitted in the form of a set of 16-bit integers. In some embodiments, the 16-bit integers may be transmitted as a sequence of three 16-bit integers. For example, a first sequence of three 16-bit integers may be used to transmit a pressure value of "34512." The initial 16-bit integer of the first sequence may indicate a data category that can be translated by a receiving computing device. For example, the initial 16-bit integer may be "11010," which may indicate a discharge pressure as the data category being transferred. Other embodiments may transmit other 16-bit integers that may indicate other sensor measurements such as an inlet pressure, pump temperature, measured humidity, or the like. The second 16-bit integer of the sequence of integers may be represented a set of pump operational parameters or statuses (e.g., a valve position, a pump status, or the like). The third 16-bit integer of the sequence of integers may be or otherwise include the value "1000011011010000," which is the binary number equivalent of "34512," or may otherwise represent a quantitative or categorical value associated with the data category.

In some embodiments, the system may categorize data as operational parameter values or sensor measurements. The transfer rate of the two data types may be different. In some embodiments, the system may transmit operational parameters at a first regular interval (e.g., more than once per second, more than once per minute, or the like). For example, the system may transmit the rotational speed of a pump centrifuge once every ten seconds. In some embodiments, the system may transmit sensor measurements based on changes in the sensor measurement. For example, a system may first normalize a pressure with respect to 1000 kilopascals, rounding to the nearest tenth (e.g., 505 kilopascals may be normalized to 0.5). After first transmitting a long-range wireless signal indicating that the measurement for a first discharge pressure is 0.5, the system may then pause. The system may stop emitting any long-range wireless signals that update the first discharge pressure or otherwise include data related to the first discharge pressure until the first discharge pressure measurement changes to a new value. Some embodiments may determine whether the magnitude of the measurement change satisfies a measurement difference threshold before including a value representing the new value or the measurement change in a long-range wireless signal. For example, a system may determine whether a discharge pressure change is greater than or equal to 150 kilopascals from a previously reported value before sending a long-range wireless signal indicating a new discharge pressure measurement. In some embodiments, sensor measurements may be acquired using equipment that is attached to an electronic pump or part of an electronic pump. For example, some embodiments may transmit an amount of available energy stored in a battery determined using an electrical sensor. In some embodiments, an alert may be transmitted by an electronic pump via a wireless signal if the amount of available energy stored in a battery of the electronic pump is below an energy threshold.

In some embodiments, transmitting the set of values for long-range transfer may include providing the set of flow measurements or other data over a LORA network or other WAN system. In some embodiments, data transfer may depend on a measured connection quality, where data transfer may be initiated if a connection quality metric exceeds a connection quality threshold and may be stopped if the connection quality metric falls below the connection quality threshold. Connection quality metrics may include metrics such as Received Signal Strength Indicator ("RSSI"), noise, signal-to-noise ratio ("SNR"), Effective Isotropic Radiated Power ("EIRP"), and Free Space Path Loss. For example, a wireless device of the fluid network that a data collection device is in communication with may obtain RSSI values, which may measure a power level of a wireless signal received by the wireless device. In response to the RSSI values satisfying a threshold value, the wireless device may initiate data transfer with the data collection device. In response to the RSSI values not satisfying the threshold value, the wireless device may stop data transfer with the data collection device. While the above is described with respect for a long-range wireless signal, similar operations may be performed for short-range wireless signals. For example, a WiFi signal's associated RSSI may be used to initiate or stop data transfer.

In some embodiments, the set of values for long-range data transfer may be transmitted using wireless signals usable for satellite communication. For example, the set of values for long-range data transfer may be transmitted using wireless signals having operating frequencies between 13000 megahertz and 15000 megahertz. In some embodiments, the set of values for long-range data transfer may be transmitted across both wireless signals having frequencies less than one gigahertz and across wireless signals having frequencies greater than one GHz, such as frequencies between 13000 megahertz and 15000 megahertz.

In some embodiments, the process 300 may include storing the set of measurements in a local memory storage of the field computing device, as indicated in block 308. In some embodiments, the local memory storage may include a solid-state drive, disk drive, or other physical memory. For example, some embodiments may store the set of measurements or other values in a 32-gigabyte non-volatile memory card. In some embodiments, the set values for long-range data transfer may also be stored in the local memory storage. The set of measurements may be stored in various formats, such as in the form of a SQL data table, a NoSQL data table, or the like. In some embodiments, the system may include a table, tree, or other data structure that uses a set of measurements as reference keys, where a reference key may be used as an index of the data structure. One or more operational parameters or one or more measurements may be used as reference keys. For example, some embodiments may use pairs of normalized rotation speeds and discharge pressures as reference keys, such that each measurement is associated with one of the pairs of normalized rotation speeds and discharge pressures.

Some embodiments may process the measurements before storing the measurements or may store the results with the measurements. In some embodiments, each measurement in a measurement duration may be added to a summed total and a count of the measurement may also be added. For example, a pressure sum for a duration may be "90" and its corresponding measurement count may be "10," and, after obtaining a measurement of "10 kPa", the system may update the pressure sum and measurement count by adding "10" to the pressure sum and "1" to the corresponding measurement count. This may result in the system updating the sum of the pressure to "100" and the measurement count to "11." Some embodiments may then determine a mean average of the set of pressure measurements by dividing the pressure sum and the measurement count. Similar operations may be performed to determine a standard deviation for a measurement by storing a sum of squares of the difference between a measurement and a mean average of measurements for each measurement and dividing by "Z–1," where Z is the measurement count.

In some embodiment, the process 300 may include determining one or more subsets of the measurements for short-range data transfer using a sampling method on the set of measurements, as indicated in block 312. Short-range data transfer may include a transfer of data using one or more short-range wireless signals. In some embodiments, the subset of measurements may have a fewer number of values than the set of measurements. The set of measurements may be sampled using one or more various sampling methods. For example, some embodiments may determine a subset based on a random sampling of the set of measurements.

Some embodiments may use a sampling method that satisfies a time distribution requirement, where the time distribution requirement includes measurements distributed across the measurement duration. For example, the subset of the measurements may include at least one measurement measured at the first third of a measurement duration, a middle third of the measurement duration, and the last third of the measurement duration. Various sampling methods may be used that satisfy this time distribution criterion. Some embodiments uniformly sample every N-th measurement of the set of measurements. Some embodiments may filter the set of measurements to a sequence of measurements such that the durations between adjacent measurement times of the sequence of measurements are similar to each other. For example, in some embodiments, the differences between durations between adjacent measurement times may be less than 50%, less than 30%, or less than 10% of a mean duration.

In some embodiments, the sampling methods may first sort the set of measurements by their measurement times and sample the set of measurements based on their measurement times such that the sampling is based on measurements being in specific measurement time intervals. For example, a set of samples may be sorted into multiple bins based on their corresponding measurement times, where each bin corresponds with an equal time interval but may be associated with a different total number of measurements. For example, each bin of a set of four bins represents a duration of one hour, where 150 measurements are in a first bin, 126 measurements are in a second bin, 185 measurements are in a third bin, and 110 measurements are in a fourth bin. The system may then use 10 samples from each of the four bins to generate a subset of the measurements.

In some embodiments, the process 300 may include performing additional computations to determine the additional values or indicators based on data transmitted from a data collection device or other mobile computing devices. For example, a field computing device of an electronic pump may perform training operations on a neural network associated with an attention-mechanism based on values transmitted from a tablet computer and measurements made by sensors of the electronic pump. The field computing device may act as an edge computing device for the data collection device by allowing the data collection device to offload computationally expensive operations onto the field computing device. The field computing device may transmit the computation results of these computationally expensive operations back to the data collection device.

In some embodiment, the process 300 may include determining whether a data collection device is within range of a short-range wireless system, as indicated in block 316. In some embodiments, the process 300 may determine that a data collection device is within range of the short-range wireless system by receiving one or more values from the short-range wireless system. For example, the short-range wireless system may include a mobile computing device such as a cell phone or tablet that transmits a WiFi request to a short-range wireless subsystem of an electronic pump. In response, a processor may determine that the data collection device is within range of the short-range wireless system.

In some embodiments, after a computing device of an electronic pump or other electronic device of a fluid distribution network receives a wireless polling signal from a data collection device, the computing device may send a wireless response signal to the data collection device indicating that the data collection device has been detected by the computing device. In some embodiments, the wireless response signal may include additional values useful for determining whether the data collection device should collect data from the computing device. For example, after receiving a wireless polling signal from a data collection device attached to an aerial vehicle, a computing device may transmit a wireless response signal to the data collection device that includes a value representing an amount of data ready for transfer. The data collection device may then compare the amount of data ready for transfer with an available memory space or predict an amount of time needed for data transfer of the data ready for transfer. If the available memory is insufficient or the amount of time needed for data transfer cannot be satisfied based on an available amount of time that the data collection device may remain in communication range of the computing device, a data transfer operation may be stopped or modified.

In some embodiments, the data collection device may be manually activated by a user to discover a short-range wireless system. For example, the user may use a tablet computing device to scan an area for WiFi signals and poll one or more short-range wireless subsystems, provide a password to the short-range wireless subsystem, and initiate data transfer with the short-range wireless subsystem. In some embodiments, as further described below, one or more computing devices of a node or other component of the fluid distribution network may receive the signal and determine whether a communication protocol of the data collection device is compatible with the wireless communication device. The set of computing devices may then send a wireless response signal to the data collection device, the signal indicating that the data collection device is compatible with a communication protocol used by the computing device to transmit data wirelessly.

In some embodiments, the data collection device may have or otherwise obtain the GPS coordinates of a wireless-enabled device stored in its collection device memory, where the wireless-enabled device may include one of the electronic pumps or standalone sensors described above. In some embodiments, the data collection device may automatically poll for compatible devices in response to a determination that the wireless-enabled device is in a communication range of the data collection device to establish a connection with the wireless-enabled device and initiate data transfer. For example, a data collection device may perform operations to automatically determine whether a stored wireless-enabled device is in a communication range based on its own GPS coordinates or reported GPS coordinates of electronic pumps in a fluid distribution network. In response to a determination that a wireless-enabled device is within range of the data collection device, the data collection device may send a request via a short-range wireless signal to the wireless-enabled device to establish a data connection and initiate a data transfer operation between the wireless-enabled device and the data collection device.

In some embodiments, operations to initiate or stop data transfer based on GPS coordinates or a connection quality metric as described above may be used in conjunction with an automated or remotely-controlled vehicle that transports a data collection device. The automated transportation of and use of a data collection device may provide a means of rapidly collecting data via short-range wireless signals from remote sites that may be infeasible to connect to using traditional wired communication methods. Such operations may allow for increased data transfer and subsequent operational planning based on data transferred from devices of a fluid distribution network.

In some embodiment, the process 300 may include determining whether multiple short-range wireless subsystems are within communication range of the data collection device, as indicated in block 320. In some embodiments, the data collection device may be within a communication range of multiple short-range wireless subsystems if the data collection device receives short-range wireless signals from multiple short-range wireless subsystems. For example, the data collection device 161 may receive short-range wireless signals from a short-range wireless subsystem of the electronic pump 122 and a short-range wireless subsystem of the electronic pump 123. In response, the process 300 may proceed to operations described for block 324. Otherwise, operations of the process 300 may proceed operations described for block 328.

In some embodiment, the process 300 may include selecting a short-range wireless subsystem based on a data collection time or priority list, as indicated in block 324. In some embodiments, a short-range wireless subsystem may be selected based on a priority list. A computing device of a data collection device may use a priority list of electronic pumps that direct the data collection device to acquire data in an order provided by the priority list. For example, the data collection device 161 may include a priority list that indicates that the data collection device 161 is to collect data from the electronic pump 123 over the data from the electronic pump 122 if both are within range. Alternatively, an electronic pump may transmit a wireless message to a data collection device that includes a priority indicator indicating that wireless data transfer between the electronic pump and the data collection device should be initiated.

In some embodiments, a short-range wireless subsystem may be selected based on a collection time. In some embodiments, the data collection device may implement instructions that include an operation to determine which of a set of available short-range wireless subsystems were least-recently able to transfer data to any data collection device. For example, the electronic pump 122 may transmit values indicating that it had last transferred data to a data collection device on a first day, and the electronic pump 123 may transmit values indicating that it had last transferred data to the data collection device on a second day, where the first day is before the second day. In response, the data collection device may initiate operations to receive measurements from the electronic pump 122.

In some embodiments, the process 300 may include determining that the data collection device is authenticated and authorized to receive data, as indicated in block 328. In some embodiments, the data collection device may be authenticated and authorized using a password/permission key. For example, the data collection device 151 may transmit an encrypted password provided by a user to the electronic pump 123. In some embodiments, after a computing device of an electronic pump or other electronic device of a fluid distribution network authenticates or authorizes a data collection device, the computing device may send a wireless response signal to the data collection device indicating that it is authenticated or authorized. In some embodiments, the authentication may also require further device authentication (e.g., multi-factorial authentication). For example, the authentication may require that a remote server provide an authentication message indicating that the credentials of a user profile displayed on a mobile computing device is authenticated via an authentication service executing on the mobile computing device.

In some embodiments, the process 300 may include sending the subset(s) of measurements for short-range data transfer to the data collection device, as indicated in block 332. As discussed above, the subsets of measurements may be sent using one or more types of wireless signals. In some embodiments, the subsets of measurements may be transmitted via a WiFi signal using a human machine interface (HMI) operating on a data collection device. For example, the HMI may be operating on a tablet device having a WiFi antenna and a user may interact with the HMI to initiate data transfer to the data collection device from the local memory storage of an electronic pump or standalone sensor.

In some embodiments, the data collection device may also transmit values or instructions back to a computing device of an electronic pump or other components of the fluid distribution network. For example, the data collection device may transmit a shutdown message to a computing device in communication with an electronic pump, where the computing device may be a part of the electronic pump or be otherwise connected to the electronic pump. In response to receiving the shutdown message from the data collection device, the computing device may deactivate the electronic pump.

In some embodiments, the process 300 may include associating one or more of the transferred subsets of measurements with an indicator indicating that the subsets of measurements are transferred, as indicated in block 336. In some embodiments, a data collection device may transmit a confirmation message to a device of the fluid distribution network, where the confirmation message may indicate that the transferred subsets of measurements have been transmitted. In some embodiments, the confirmation message may include one or more hash results usable to confirm that values have been correctly transferred. Some embodiments may delete a transferred subset from a local memory storage in response to the presence of an indicator indicating that the subset has been transferred. Alternatively, the transferred subset may remain stored in the local memory storage, and the indicator may be used to indicate that the data should be transferred only if one or more predetermined transfer variables are set. For example, some embodiments may receive a message configuring a predetermined transfer variable to "permit additional transfer" and, in response, transfer a previously-transferred subset of measurements.

In some embodiments, the process 300 may include sending the transferred data to a learning system or simulator system, as indicated in block 340. Long-term phenomena may include trends in fluid properties or operational parameters that occur over a duration that is longer than an hour, longer than a day, longer than a week, longer than a month, or the like. In some embodiments, analysis to detect a long-term phenomenon that may occur over a slower time period ("slow-rate analysis") may be used to increase the operational performance by generating messages indicating that a piece of equipment may require maintenance operations, repair operations, or the like. In some embodiments, the learning system or simulator system may also be used to provide operational parameters to be transmitted back to the electronic pumps or other electronic components of a fluid distribution network.

In some embodiments, the learning system may include support vector machines, neural networks, deep learning systems, or the like. The learning system may use one or more different learning mechanisms, such as an attention mechanism, a reinforcement learning mechanism, an adversarial network mechanism, a symbolic AI subsystem, some combination thereof, or the like. In some embodiments, a learning system may be trained using sensor measurements and operational parameters as training inputs or training objectives and may also include using one or more categories indicating one or more long-term phenomena as training objectives. For example, a first learning system may be trained by using pump rotation speeds, a set of pump inlet pressure measurements, and a set of pump discharge pressure measurements as training inputs and flow rates measured by a flowmeter as training objectives. The trained first learning system may then be used to predict flow rate measurements without using flowmeters based on sensor measurements. Another learning system may use, as inputs, pump engine parameters such as an engine temperature or a fuel consumption to predict equipment statuses such as pump rotor wear or fluid hose degradation. These equipment statuses may cause the system to send maintenance or repair instructions such as instructions to perform a diagnostic inspection, extend a rebuild cycle of a pump, or the like.

Some embodiments may use a learning system to provide response parameters based on data such as sensor measurements and recorded operational parameters. In some embodiments, the system may apply other analytical techniques such as regression analysis to predict long-term phenomena and determine response parameters. Some embodiments may use these response parameters to determine future operational parameters or other values. Some embodiments may then send the determined operational parameters or other values to a set of electronic pumps or other electronic components of a fluid distribution network via a mesh network. The set of electronic pumps or other electronic components may use the operational parameters to modify the operations of the set of electronic pumps to increase the efficiency or reliability of equipment in the fluid distribution network.

In some embodiments, the transferred data may be sent to a simulator system, which may be part of the learning system or independent of the learning system. In some embodiments, the simulator system may include the use of fluid flow models (e.g., Navier-Stokes model). In some embodiments, the simulator system may include or otherwise use a computational fluid dynamics simulation software package such as COMSOL CFD, Ansys CFD, OpenFOAM, or the like. Alternatively, or in addition, the simulator system may include the use of empirical models of fluid flow. For example, an empirical model may be based on pump power rates, fluid pressures, and elevation measurements to predict an effective pumping distance.

In some embodiments, analysis of flow rates may increase the accuracy of a computational fluid model or empirical model. In some embodiments, one or more GPS coordinates of a pump or other components of the fluid distribution network may be used to increase further the accuracy of a computational fluid model or empirical model used to plan or modify the design of a fluid distribution network. In some embodiments, the design of a fluid distribution network may be based on a target value such as target minimum flow rate or a target friction loss value. For example, a first plan may be developed based on an initial prediction that a 223-kilowatt pump may allow fluids to travel approximately 4 km to 5 km and that a 450-kilowatt pump may push fluids between 8.0 to 9.6 km. A second plan may be developed after analysis based on the transferred measurements, where the analysis may indicate that a maximum acceptable pumping range of the 223-kilowatt pump may be approximately 3.6 to 4.5 km and that a maximum acceptable pumping range of the 450-kilowatt pump may be approximately 6.1 to 7.2 km.

Figure 4:
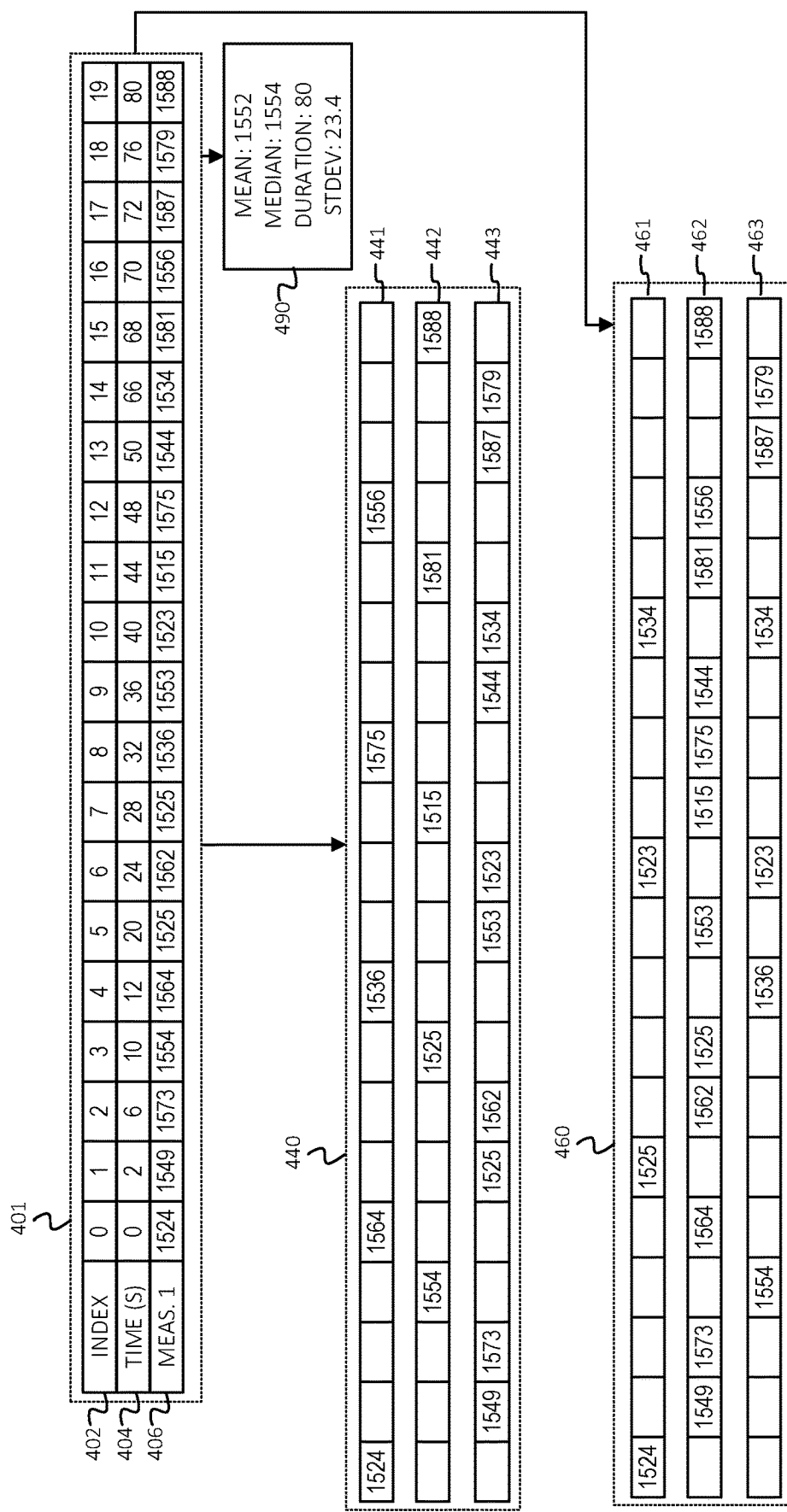
FIG. 4 is a diagram demonstrating the implementation of a sampling method to determine a subset of measurements for short-range data transfer based on a set of measurements, in accordance with some embodiments.

FIG. 4 is a diagram demonstrating the implementation of a sampling method to determine a subset of measurements for short-range data transfer based on a set of measurements, in accordance with some embodiments. Table 401 includes a first row representing a set of indices 402 for a set of measurements 406, where the set of measurements 406 may be obtained by a sensor of an electronic pump or a standalone sensor. Table 401 also includes a second row representing a set of measurement times 404 corresponding to each of the set of measurements 406.

In some embodiments, a computing device of an electronic pump or standalone sensor may determine a set of values for long-range data transfer based on a set of measurements. For example, a computing device may determine a set of values 490 that includes the mean, median, and standard deviation of the set of measurements 406. The set of values 490 may also include other measurement information such as a measurement duration. The set of values for long-range data transfer may include one or more measures of central tendency, measures of deviation, or measures of kurtosis. While not shown, the set of values for long-range data transfer may include a plurality of measures of central tendency, where each measure of central tendency may be based on a plurality of measurements corresponding to a time interval in the measurement duration. For example, the set of values for long-range data transfer may include the mean average of the initial ten measurements shown in the set of measurements 406 and may include the mean average of the latter ten measurements shown in the set of measurements 406.

In some embodiments, a computing device of an electronic pump or standalone sensor may partition a set of measurements into subsets of measurements for data transfer using a sampling method that includes data samples from every N-th time interval of a measurement duration, where N may be a constant integer. For example, the set of measurements may be partitioned into the subsets 440, which include the first subset of measurements 441, the second subset of measurements 442, and the third subset of measurements 443. The first subset of measurements 441 may be determined from the set of measurements 406 by including every fourth measurement based on the set of indices 402 beginning with the measurement associated with the index value zero (e.g., including every measurement associated with an index value such that the remainder when dividing the index value by four is equal to zero). Similarly, the second subset of measurements 442 may be determined from the set of measurements 406 by including every measurement associated with an index value such that the remainder when dividing the index value by four is equal to three. In addition, the third subset of measurements 443 may be determined from the set of measurements 406 by including every measurement associated with an index value such that the remainder when dividing the index value by four is equal to either one or two (e.g., "1," "2," "5," "6," etc.).

In some embodiments, a computing device of an electronic pump or standalone sensor may partition a set of measurements into subsets of measurements for data transfer after first partitioning a measurement time. In some embodiments, the subsets of measurement for data transfer may be determined by partitioning the measurement duration into N intervals, where N may be any integer greater than one. Some embodiments may then acquire a minimum number of samples within each interval, such as at least one sample from each interval. For example, some embodiments may include operations to obtain exactly an equal number of samples from each interval. Alternatively, some embodiments may obtain different numbers of samples from each interval.

For example, some embodiments may partition the set of measurements 406 by splitting the measurement duration of 80 seconds into four separate intervals, where a first interval may be the time before 20 seconds starting from 0 seconds, a second interval may be the time before 40 seconds starting from 20 seconds, a third interval may be the time before 60 seconds starting from 40 seconds, and a fourth interval may be the time between 60 seconds and 80 seconds. Some embodiments may then determine a fourth subset of measurements 461, a fifth subset of measurements 462, and a sixth subset of measurements 463. The fourth subset of measurements 461 may be determined from the set of measurements 406 by including every first measurement from each time interval described above, resulting in the fourth subset of measurements 461 including the measurement 1524 kPa corresponding with the measurement time 0 seconds, the measurement 1525 kPa corresponding with the measurement time 20 seconds, the measurement 1523 kPa corresponding with the measurement time 40 seconds, and the measurement 1534 kPa corresponding with the measurement time 66 seconds. In addition, the fifth subset of measurements 462 may be determined from the set of measurements 406 by including every measurement associated with a second, third, and last measurement time for each interval. In addition, the sixth subset of measurements 463 may be determined from the set of measurements 406 by including every measurement from the set of measurements 406 not included in the fourth subset of measurements 461 or fifth subset of measurements 462.

As described elsewhere, each of these subsets of measurements may then be individually transferred via a short-range data transfer, such as via a Wi-Fi signal. For example, all the measurements of the first subset of measurements 441 may be transferred to a data collection device before any of the measurements of the second subset of measurements 442 are transferred to the data collection device. By prioritizing data transfer by subsets of measurements, some embodiments may account for transfer signal loss other possible signal interruptions. Thus, even if only some of the subsets of measurements are transferred before a data connection is terminated, some embodiments may obtain a set of measurements across a measurement duration (e.g., at least one measurement from every N-th partition of a measurement duration, where N is an integer).

As shown by the subsets 440 or the subsets 460, each of the sampling method used to determine the subsets 440 or 460 values from different time intervals of a measurement duration may be split into N non-overlapping time intervals, where N may be an integer greater one. For example, each of the subsets of measurements 441-443 includes at least one value from each time interval of the measurement duration when divided into five time intervals (e.g., each of the time intervals is a quintile of the measurement duration). Furthermore, if a subset of measurements include at least one value from each time interval of the measurement duration when each time interval is one of a set of equal-time-interval quintiles of a measurement duration, the subset of measurements may also include at least one value from each quartile of the measurement duration and at least one value from each third of the measurement duration. For example, if a first measurement was measured in an earliest quintile of a measurement duration, and a second measurement was measured in the latest quintile of the measurement duration, then the first measure is also measured in the earliest quartile of the measurement duration, and the second measure is also measured in the latest quartile of the measurement duration.

Computer System

Figure 5:
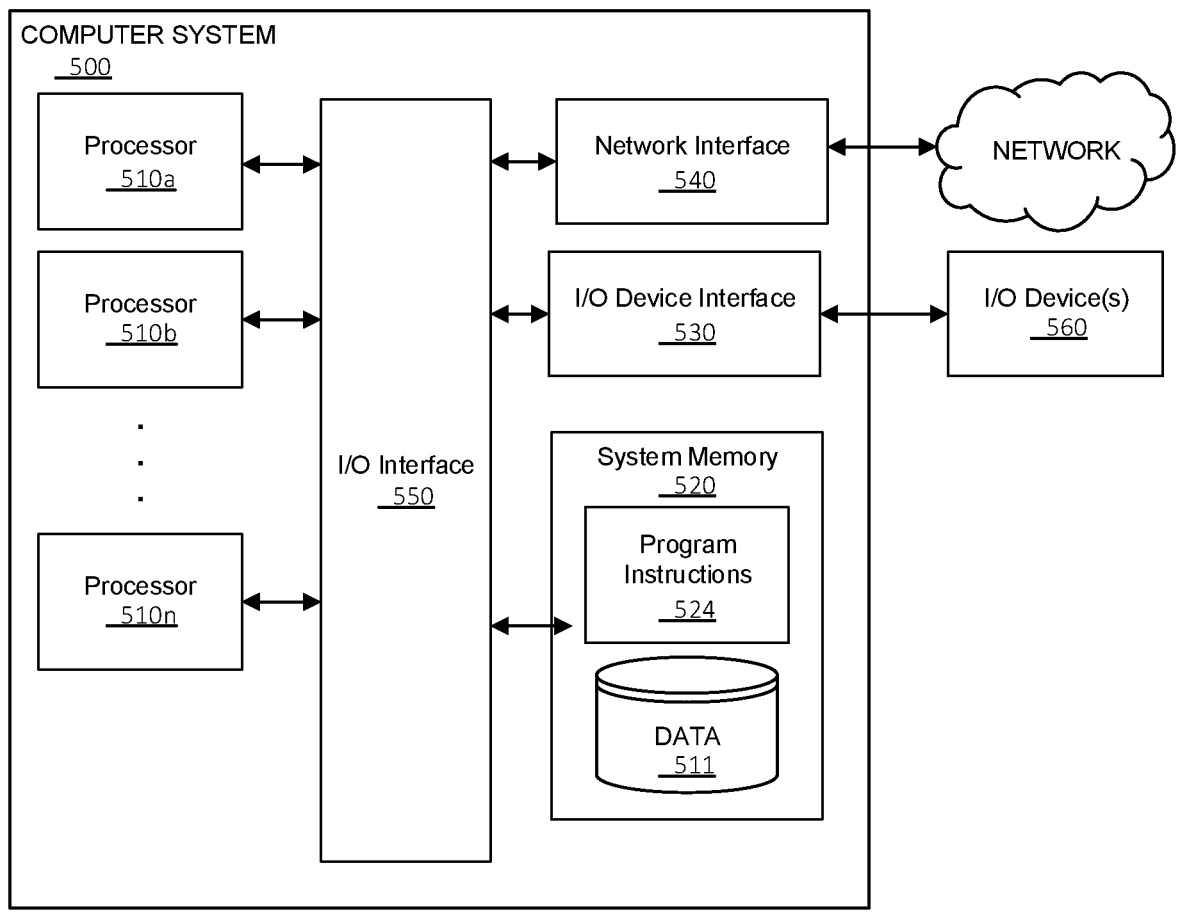
FIG. 5 shows an example of a computing device by which the present techniques may be implemented, in accordance with some embodiments.

FIG. 5 shows an example of a computing device by which the present techniques may be implemented, in accordance with some embodiments. Various portions of systems and methods described herein, may include or be executed on one or more computing devices similar to computer system 500. Further, processes and modules described herein may be executed by one or more processing systems similar to that of computer system 500.

Computing system 500 may include one or more processors (e.g., processors 510a-510n) coupled to system memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a uni-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., a vision processing unit (VPU), a neuromorphic complementary metal-oxide-semiconductor (CMOS) chip, an FPGA (field programmable gate array), a PGA (programmable gate array), or an ASIC (application specific integrated circuit) such as a tensor processing unit (TPU). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer system, for example, may be connected to computer system 500 via a network and network interface 540.

Network interface 540 may include a network adapter that provides for connection of computer system 500 to a network. Network interface may 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 524 or data 511. Program instructions 524 may be executable by a processor (e.g., one or more of processors 510a-510n) to implement one or more embodiments of the present techniques. Program instructions 524 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 520 may include a non-transitory computer readable storage medium that may have program instructions stored thereon that are executable by a computer processor (e.g., one or more of processors 510a-

510*n*) to cause the subject matter and the functional operations described herein. A memory (e.g., system memory 520) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 550 may be configured to coordinate I/O traffic between processors 510*a*-510*n*, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510*a*-510*n*). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computing system 500 may include any combination of devices or software that may perform or otherwise provide for the performance of the techniques described herein. For example, computer system 500 may include or be a combination of a cloud-computer system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 500 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, sent via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information sent over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X' ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A system for transmitting electronic pump pressure data comprising: a first computing device of an electronic pump that comprises one or more processors programmed with program instructions that, when executed, cause the first computing device to perform operations comprising: obtaining a set of pressure measurements at the electronic pump, wherein each measurement time of the set of pressure measurements is within a measurement duration, and wherein the set of pressure measurements is acquired at a rate greater than or equal to once per minute; storing the set of pressure measurements in a memory storage of the first computing device; determining a measure of central tendency based on the set of pressure measurements; sending the measure of central tendency to a second computing device via a first wireless signal, wherein an operating frequency of the first wireless signal is between zero hertz and one gigahertz; determining a first subset of pressure measurements based on the set of pressure measurements, wherein the first subset of pressure measurements comprises a first measurement and a second measurement, and wherein the first measurement was measured in an earliest quartile of the measurement duration and the second measurement was measured in a latest quartile of the measurement duration; transferring the first subset of pressure measurements to a data collection device via a second wireless signal, wherein an operating frequency of the second wireless signal is greater than one gigahertz; receiving a confirmation from the data collection device that the first subset of pressure measurements was transferred; and deleting the first subset of measurements from the memory storage.

2. The system of embodiment 1, wherein the electronic pump is a first electronic pump, and wherein the second computing device is part of a second electronic pump.

3. The system of any of embodiments 1 to 2, wherein transmitting the first subset of pressure measurements to the data collection device comprises: determining whether a connection quality metric satisfies a connection quality threshold; and in response to a determination that the connection quality metric satisfies the connection quality threshold, transmitting the first subset of pressure measurements to the data collection device.

4. A tangible, non-transitory, machine-readable medium storing instructions that when executed by one or more processors effectuate operations comprising: obtaining a first set of measurements at a first computing device of a first electronic pump, wherein a wireless device is in wired communication with the first computing device, and wherein each measurement time of the first set of measurements is within a measurement duration; determining a first set of values based on the first set of measurements, wherein the first set of values has a fewer number of values than the first set of measurements, and wherein determining the first set of values comprises determining a sum of the first set of measurements; storing the first set of measurements in a memory of the first computing device; sending the first set of values to a second computing device via a first wireless signal transmitted by the wireless device, wherein an operating frequency of the first wireless signal is within a first frequency range, and wherein the first frequency range is inclusively between zero hertz and one gigahertz; determining a first subset of measurements based on the first set of measurements, wherein the first subset of measurements comprises a first measurement and a second measurement, and wherein the first measurement was measured in an earliest quartile of the measurement duration and the second measurement was measured in a latest quartile of the measurement duration; transmitting the first subset of measurements to a third computing device via a second wireless signal, wherein an operating frequency of the second wireless signal is within a second frequency range that is greater than one gigahertz; and associating the first subset of measurements with a second indicator to indicate that the first set of measurements have been transferred.

5. The medium of embodiment 4, further comprising: determining a second subset of measurements based on the first set of measurements and the measurement duration, wherein the second subset of measurements comprises a third measurement and a fourth measurement, and wherein the third measurement was measured in the earliest quartile of the measurement duration and the fourth measurement was measured in the latest quartile of the measurement duration, and wherein the second subset of measurements is different from the first subset of measurements; and transmitting the second subset of measurements to the third computing device via a second wireless signal, wherein an operating frequency of the second wireless signal operates within the second frequency range.

6. The medium of any of embodiments 4 to 5, further comprising: obtaining a geospatial coordinate based on the first computing device; and transmitting the geospatial coordinate of the first computing device.

7. The medium of any of embodiments 4 to 6, wherein the third computing device is attached to an autonomous vehicle, and wherein the operations further comprise sending geospatial coordinates of the first computing device to the autonomous vehicle.

8. The medium of any of embodiments 4 to 7, wherein transmitting the first subset of measurements to the third computing device comprises sending a portion of the first subset of measurements via a third wireless signal, wherein an operating frequency of the third wireless signal operates within a third frequency range that is greater than one gigahertz and is different from the second frequency range.

9. The medium of any of embodiments 4 to 8, further comprising sending a wireless response signal to the third computing device, wherein the wireless response signal comprises a third indicator to indicate that the third computing device has been detected by the first computing device.

10. The medium of any of embodiments 4 to 9, wherein determining the first set of values comprises determining a measure of central tendency based on the first set of measurements, wherein the first set of values comprises the measure of central tendency.

11. The medium of any of embodiments 4 to 10, wherein the computing device is attached to a wireless charging device and the operations further comprises: receiving a message from the third computing device, wherein the message comprises instructions to activate the wireless charging device; and activate the wireless charging device in response to receiving the message.

12. The medium of any of embodiments 4 to 11, the operations further comprising: obtaining a geospatial position associated with the third computing device; and transmitting the geospatial position via third wireless signal, wherein the third wireless signal operates within the first frequency range.

13. The medium of any of embodiments 4 to 12, wherein the wireless device is a first wireless device, and wherein the operations further comprise: determining that the third computing device is within a communication range of a set of wireless devices, wherein the set of wireless devices comprises the first wireless device; and selecting the first wireless device for data transfer from the set of wireless devices in communication range with the third computing device based on a priority list.

14. The medium of any of embodiments 4 to 13, the operations further comprising: determining, with the first computing device, a computation result based on the first set of measurements; and providing, with the first computing device, the computation result to the third computing device.

15. The medium of any of embodiments 4 to 14, further comprising: determining an amount of available energy; and transmitting a third wireless signal comprising a value correlated with the amount of available energy.

16. The medium of any of embodiments 4 to 15, wherein the first computing device is in electrical contact with a battery, and wherein the battery is in electrical contact with a solar cell, wherein the operations further comprise: determining a first amount of energy being provided by the solar cell; and determining a second amount of energy stored in the battery.

17. The medium of any of embodiments 4 to 16, wherein the first wireless signal comprises a set of 16-bit integers, and wherein: a first 16-bit integer of the set of 16-bit integers comprises a value indicating a data category; and a second 16-bit integer of the set of 16-bit integers comprises a value indicating a quantitative or categorical value associated with the data category.

18. The medium of any of embodiments 4 to 17, further comprising transmitting the first set of values to a fourth computing device from the third computing device.

19. The medium of any of embodiments 4 to 18, further comprising sending a shutdown message from the third computing device to the first computing device, wherein the first computing device is configured to deactivate a pump in communication with the first computing device in response to receiving the third computing device.

20. A method comprising: obtaining a set of measurements at a first computing device of an electronic pump, wherein a wireless device is in wired communication with the first computing device, and wherein each measurement time of the set of measurements is within a measurement duration; determining a set of values based on the set of measurements, wherein the set of values has a fewer number of values than the set of measurements; storing the set of measurements in a memory of the first computing device; sending the set of values to a second computing device via a first wireless signal transmitted by the wireless device; determining a subset of measurements based on the set of measurements; transmitting the subset of measurements to a third computing device via a second wireless signal, wherein an operating frequency of the second wireless signal is greater than an operating frequency of the first wireless signal; and associating the subset of measurements with a second indicator to indicate that the set of measurements have been transferred.

What is claimed is:

1. A system for transmitting electronic pump pressure data comprising:
    a first computing device of an electronic pump that comprises one or more processors programmed with program instructions that, when executed, cause the first computing device to perform operations comprising:
        obtaining a set of pressure measurements at the electronic pump, wherein each measurement time of the set of pressure measurements is within a measurement duration, and wherein the set of pressure measurements is acquired at a rate greater than or equal to once per minute;
        storing the set of pressure measurements in a memory storage of the first computing device;
        determining a measure of central tendency based on the set of pressure measurements;
        sending the measure of central tendency to a second computing device via a first wireless signal, wherein an operating frequency of the first wireless signal is between zero hertz and one gigahertz;
        determining a first subset of pressure measurements based on the set of pressure measurements, wherein the first subset of pressure measurements comprises a first measurement and a second measurement, and wherein the first measurement was measured in an earliest quartile of the measurement duration and the second measurement was measured in a latest quartile of the measurement duration;
        transferring the first subset of pressure measurements to a data collection device via a second wireless signal, wherein an operating frequency of the second wireless signal is greater than one gigahertz;
        receiving a confirmation from the data collection device that the first subset of pressure measurements was transferred; and
        deleting the first subset of measurements from the memory storage.

2. The system of claim 1, wherein the electronic pump is a first electronic pump, and wherein the second computing device is part of a second electronic pump.

3. The system of claim 1, wherein transmitting the first subset of pressure measurements to the data collection device comprises:
    determining whether a connection quality metric satisfies a connection quality threshold; and
    in response to a determination that the connection quality metric satisfies the connection quality threshold, transmitting the first subset of pressure measurements to the data collection device.

4. A tangible, non-transitory, machine-readable medium storing instructions that when executed by one or more processors effectuate operations comprising:
    obtaining a first set of measurements at a first computing device of a first electronic pump, wherein a wireless device is in wired communication with the first computing device, and wherein each measurement time of the first set of measurements is within a measurement duration;
    determining a first set of values based on the first set of measurements, wherein the first set of values has a fewer number of values than the first set of measurements, and wherein determining the first set of values comprises determining a sum of the first set of measurements;
    storing the first set of measurements in a memory of the first computing device;
    sending the first set of values to a second computing device via a first wireless signal transmitted by the wireless device, wherein an operating frequency of the first wireless signal is within a first frequency range, and wherein the first frequency range is inclusively between zero hertz and one gigahertz;
    determining a first subset of measurements based on the first set of measurements, wherein the first subset of measurements comprises a first measurement and a second measurement, and wherein the first measurement was measured in an earliest quartile of the measurement duration and the second measurement was measured in a latest quartile of the measurement duration;
    transmitting the first subset of measurements to a third computing device via a second wireless signal, wherein an operating frequency of the second wireless signal is within a second frequency range that is greater than one gigahertz; and
    associating the first subset of measurements with a second indicator to indicate that the first set of measurements have been transferred.

5. The medium of claim 4, further comprising:
  determining a second subset of measurements based on the first set of measurements and the measurement duration, wherein the second subset of measurements comprises a third measurement and a fourth measurement, and wherein the third measurement was measured in the earliest quartile of the measurement duration and the fourth measurement was measured in the latest quartile of the measurement duration, and wherein the second subset of measurements is different from the first subset of measurements; and
  transmitting the second subset of measurements to the third computing device via a second wireless signal, wherein an operating frequency of the second wireless signal operates within the second frequency range.

6. The medium of claim 4, further comprising: obtaining a geospatial coordinate based on the first computing device; and transmitting the geospatial coordinate of the first computing device.

7. The medium of claim 4, wherein the third computing device is attached to an autonomous vehicle, and wherein the operations further comprise sending geospatial coordinates of the first computing device to the autonomous vehicle.

8. The medium of claim 4, wherein transmitting the first subset of measurements to the third computing device comprises sending a portion of the first subset of measurements via a third wireless signal, wherein an operating frequency of the third wireless signal operates within a third frequency range that is greater than one gigahertz and is different from the second frequency range.

9. The medium of claim 4, further comprising sending a wireless response signal to the third computing device, wherein the wireless response signal comprises a third indicator to indicate that the third computing device has been detected by the first computing device.

10. The medium of claim 4, wherein determining the first set of values comprises determining a measure of central tendency based on the first set of measurements, wherein the first set of values comprises the measure of central tendency.

11. The medium of claim 4, wherein the computing device is attached to a wireless charging device and the operations further comprises:
  receiving a message from the third computing device, wherein the message comprises instructions to activate the wireless charging device; and
  activate the wireless charging device in response to receiving the message.

12. The medium of claim 4, the operations further comprising:
  obtaining a geospatial position associated with the third computing device; and
  transmitting the geospatial position via third wireless signal, wherein the third wireless signal operates within the first frequency range.

13. The medium of claim 4, wherein the wireless device is a first wireless device, and wherein the operations further comprise:
  determining that the third computing device is within a communication range of a set of wireless devices, wherein the set of wireless devices comprises the first wireless device; and
  selecting the first wireless device for data transfer from the set of wireless devices in communication range with the third computing device based on a priority list.

14. The medium of claim 4, the operations further comprising:
  determining, with the first computing device, a computation result based on the first set of measurements; and
  providing, with the first computing device, the computation result to the third computing device.

15. The medium of claim 4, further comprising:
  determining an amount of available energy; and
  transmitting a third wireless signal comprising a value correlated with the amount of available energy.

16. The medium of claim 4, wherein the first computing device is in electrical contact with a battery, and wherein the battery is in electrical contact with a solar cell, wherein the operations further comprise:
  determining a first amount of energy being provided by the solar cell; and
  determining a second amount of energy stored in the battery.

17. The medium of claim 4, wherein the first wireless signal comprises a set of 16-bit integers, and wherein:
  a first 16-bit integer of the set of 16-bit integers comprises a value indicating a data category; and
  a second 16-bit integer of the set of 16-bit integers comprises a value indicating a quantitative or categorical value associated with the data category.

18. The medium of claim 4, further comprising transmitting the first set of values to a fourth computing device from the third computing device.

19. The medium of claim 4, further comprising sending a shutdown message from the third computing device to the first computing device, wherein the first computing device is configured to deactivate a pump in communication with the first computing device in response to receiving the third computing device.

20. A method comprising:
  obtaining a set of measurements at a first computing device of an electronic pump, wherein a wireless device is in wired communication with the first computing device, and wherein each measurement time of the set of measurements is within a measurement duration;
  determining a set of values based on the set of measurements, wherein the set of values has a fewer number of values than the set of measurements;
  storing the set of measurements in a memory of the first computing device;
  sending the set of values to a second computing device via a first wireless signal transmitted by the wireless device;
  determining a subset of measurements based on the set of measurements;
  transmitting the subset of measurements to a third computing device via a second wireless signal, wherein an operating frequency of the second wireless signal is greater than an operating frequency of the first wireless signal; and
  associating the subset of measurements with a second indicator to indicate that the set of measurements have been transferred.

* * * * *